United States Patent [19]
Asano

[11] 3,872,485
[45] Mar. 18, 1975

[54] AUTO-PROCESS CAMERA HAVING SELECTIVELY INSERTABLE SELF DEVELOPING FILM SHEETS

[75] Inventor: Yoshio Asano, Hyogo, Japan

[73] Assignee: Fuji Photo Film Co., Ltd., Minami Ashigara-shi, Kangawa, Japan

[22] Filed: Nov. 6, 1973

[21] Appl. No.: 413,306

[30] Foreign Application Priority Data
Nov. 6, 1972  Japan.............................. 47-111514

[52] U.S. Cl..................... 354/83, 354/174, 354/288
[51] Int. Cl. .......................................... G03b 17/50
[58] Field of Search ......... 354/85, 86, 83, 288, 174, 354/180

[56] References Cited
UNITED STATES PATENTS
2,455,125  11/1948  Land................................... 354/86
3,691,920  9/1972  Harvey................................ 354/86

Primary Examiner—Richard L. Moses
Attorney, Agent, or Firm—Sughrue, Rothwell, Mion, Zinn & Macpeak

[57] ABSTRACT

An auto-process camera having a normally sealed introduction opening through which one or several monosheets contained in and protected by a light-proof envelope are inserted as far as a set position as one unit in the camera, the envelope being stripped from the monosheets in light-proof condition within the camera, and successive monosheets being automatically moved forwards to and held at a set position for exposure to light reflected from an object to be photographed and through the camera lens, subsequent to exposure, automatically process and remove from the camera, whereby variable numbers of monosheets may be introduced into said camera on different occasions.

7 Claims, 17 Drawing Figures (a)

(b)

(A)

(B)

(C)

AUTO-PROCESS CAMERA HAVING SELECTIVELY INSERTABLE SELF DEVELOPING FILM SHEETS

The present invention relates to an auto-process camera employing a film, popularly termed a monosheet, which is a composite assembly of a photosensitive sheet, upon which a negative image of an object to be photographed may be formed, positive film, uppon which a corresponding positive image may be produced, and a sac containing a solution of processing and developing chemecals, and more particularly to an auto-process camera wherein an arbitrary number of monosheets may be inserted as and when required.

There has recently been developed a type of camera employing a special kind of self-processing film, whereby a print containing the positive image of an object photographed may be obtained almost immediately after the film is exposed to light reflected from the object, successive shots of an object, or objects, being produced on successive plates, or sheets, of film. Such cameras go under a variety of popular or trade appellations, such as auto-print, auto-copy, instant-copy, or auto-process cameras, and similarly, film used in such cameras may be termed instant-process film, auto-developer film, or monosheet. For the purpose of the present description, this type of camera wil be referred to as an auto-process camera, and the type of film employed therein as a monosheet.

Auto-process cameras present considerably advantages over other type of cameras. For example, a photographer is a saved the trouble and time of developing, or having developed, films in a separate, specially installed location Also, it is possible to take a small number of individual shots without concern about rolls of film. However, there are inherent defects in conventional auto-process cameras, particularly in cameras which employ a light-proof film container and feed-in means in the form of a pack containing individually stacked monosheets, or of a cartridge containing a continuous series of monosheets, and wherein successive monosheets are brought to a position for exposure for receiving external images. Such conventional cameras are generally bulky and unwieldy, thus hampering camera manipulation, and preventing full development of a photographer's skill. Another disadvantage is that the number of monosheets that may be inserted into a camera at any one time is set, and may not be changed. Therefore, when a photographer wishes to rapidly take more shots of an object than there are monosheets still available in a camera, he or she must either renounce taking the desired number of shots, or must sacrifice the remaining available monosheets and insert a complete new pack, or cartridge. For example, supposing the number of monosheets insertable at any one time into a camera to be 10, if, when there are only 2 unexposed monosheets left in the camera, the photographer wishes to take 4–6 shots, in rapid succesion, of an object, the photographer either takes only 2 shots of the object, that is, less than the required number, or ejects the remaining 2 monosheets. If the first course is followed, the photographer has the disappointment of failing to obtain the number of shots he or she required, and the second course is obviously uneconomical.

It is accordingly an object of the present invention to provide an auto-process camera wherein variable numbers of monosheets may be introduced according to requirements of different situations.

It is another object of the invention to provide an auto-process camera that is light and compact, thereby permitting full scope for exercise of photographic techniques.

A still further object of the present invention is to provide an auto-process camera which is simple and economical in construction.

In accomplishing these and other objects, there is provided, according to the present invention, an auto-process camerra comprising an insertion opening through which one or several monosheets contained in and protected by a light-proof envelope may be inserted as far as a set position in the camera. The envelope is stripped from the monosheet, or monosheets, in light-proof conditions within the camera, and successive monosheets are automatically moved forwards to and held at a set position for exposure to light reflected from an object to be photographed and through the camera lens, subsequent to exposure, each successive monosheet is automatically processed and removed from the camera.

These and other objects and features of the present invention will become apparent from the following description taken by way of example with reference to the accompanying drawings, in which;

FIG. 4b is a plane view, on an enlarged scale, showing a different position of the apparatus of FIG. 4a.

Figure 1:
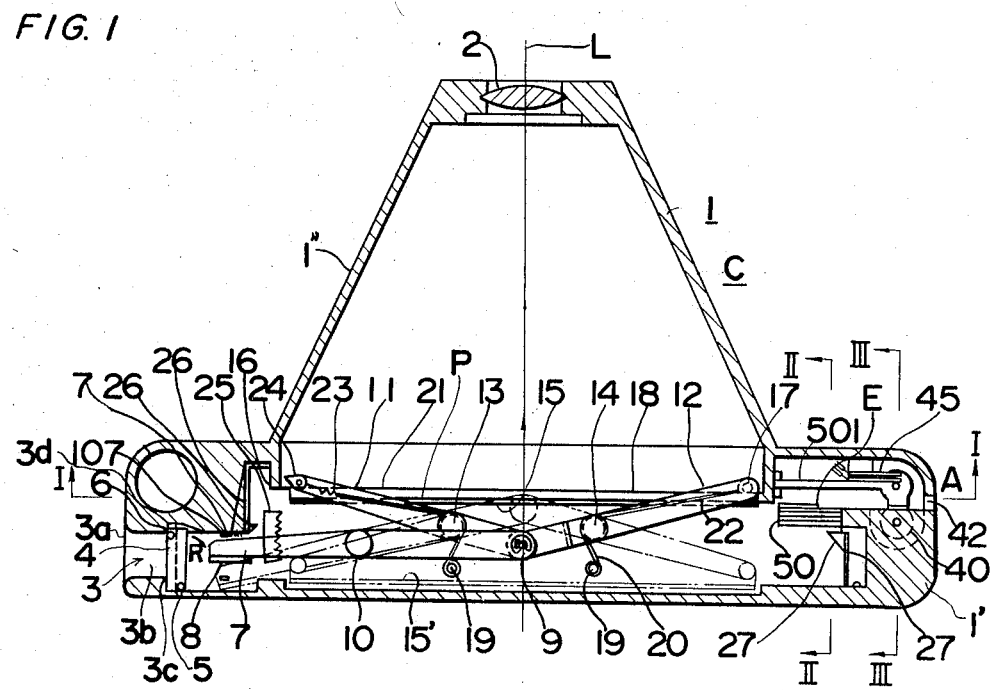
FIG. 1 is a cross-sectional view of a 1st embodiment of the present invention.
Figure 8:
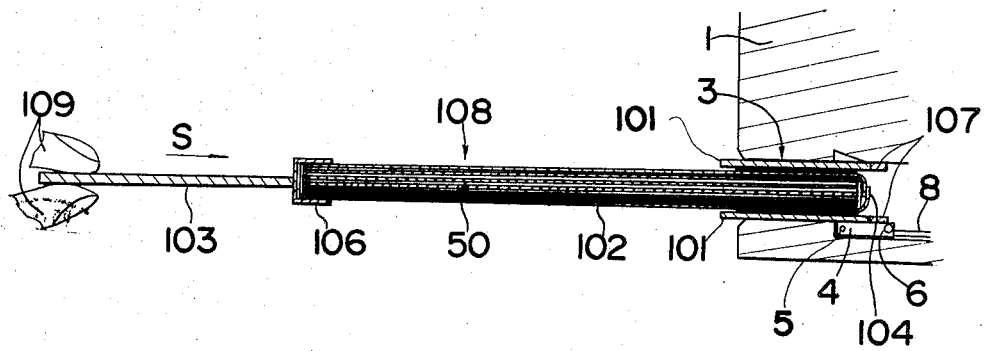
Figure 9:
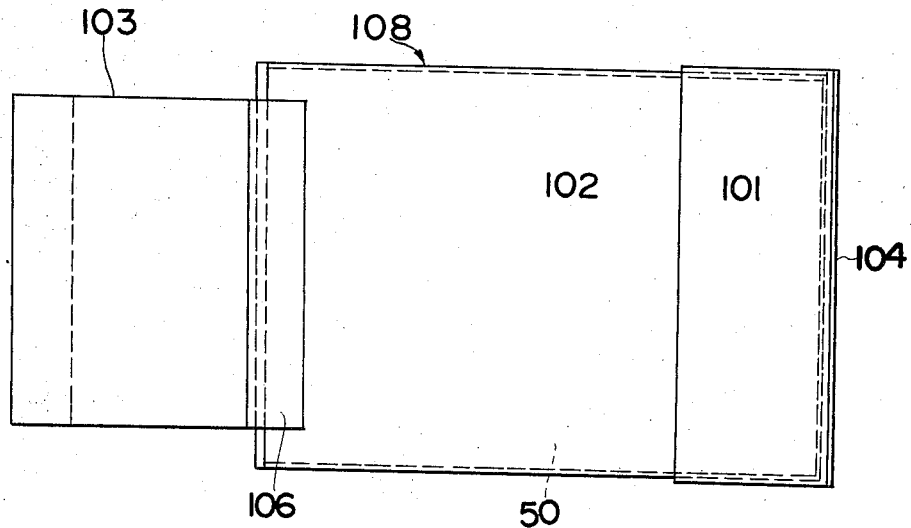
Figure 10:
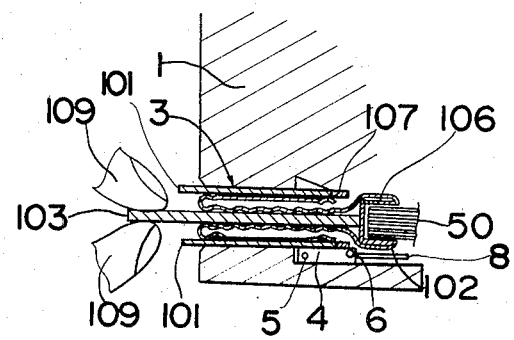
Figure 11:
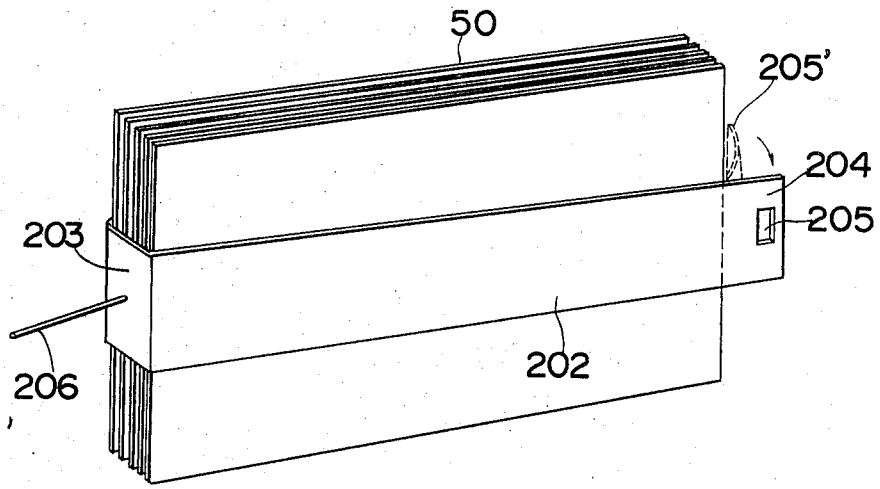
Figure 12:
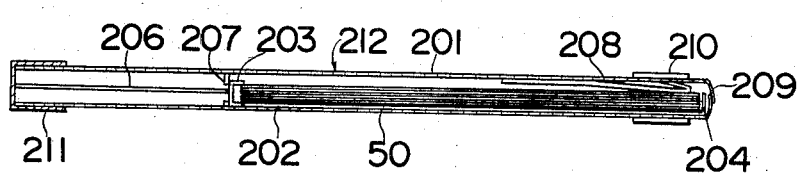
Figure 13:
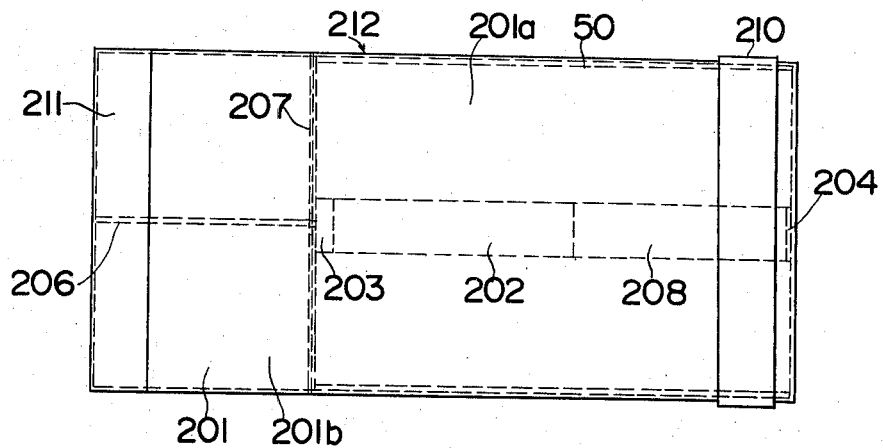
Figure 14:
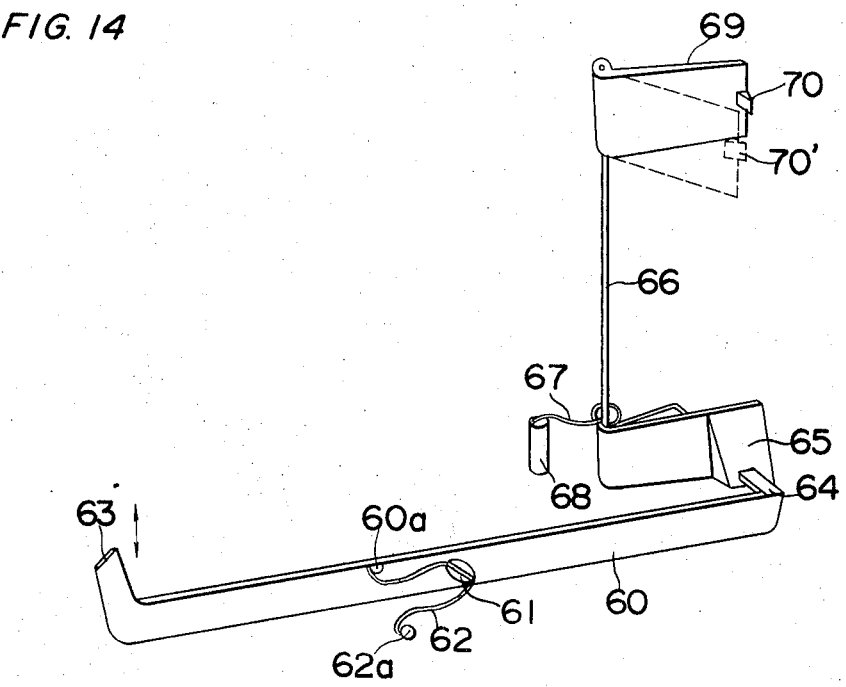
Figure 15:
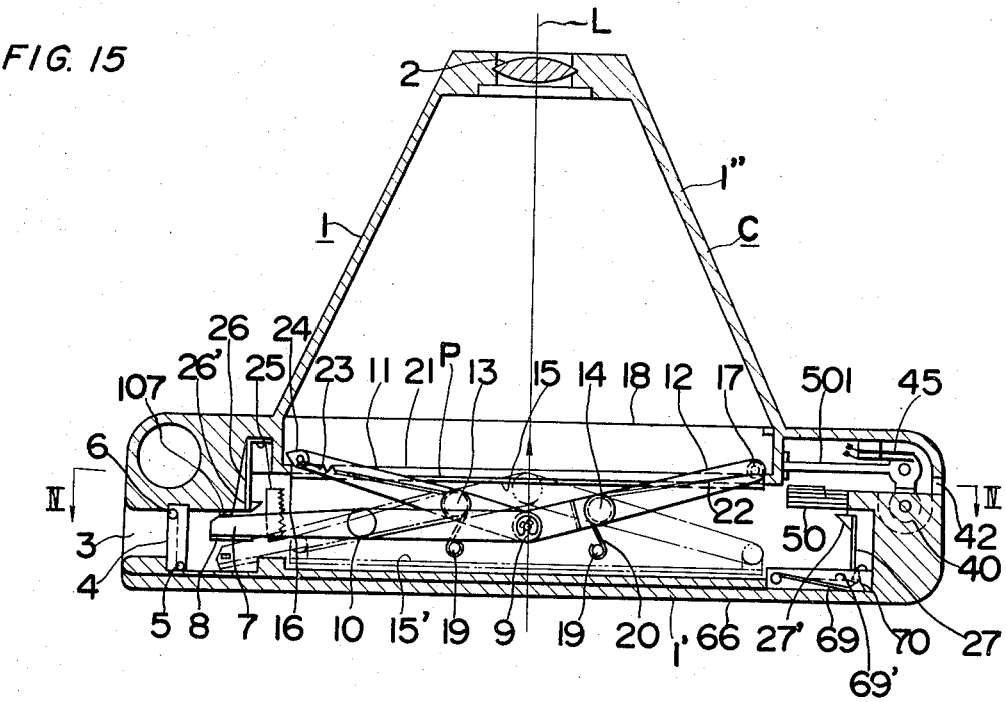
Figure 16:
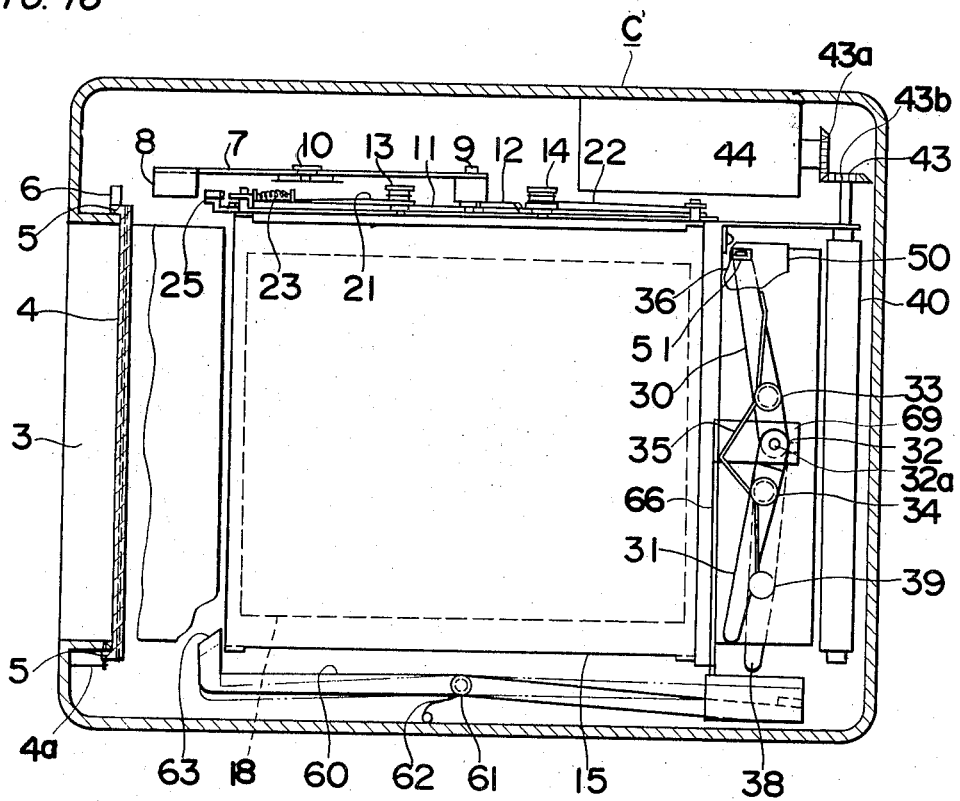

FIG. 8 is a cross-sectional view of a monosheet pack as employed in the 1st embodiment of FIG. 1, FIG. 9 is a schematic plane view of the monosheet pack shown in FIG. 8, FIG. 10 is a cross-sectional view showing insertion of the monosheet pack into a camera shown in FIG. 1, FIG. 11 is a perspective view of a monosheet cassette as employed in a second embodiment of the present invention, FIG. 12 is a cross-sectional view of FIG. 11, FIG. 13 is a schematic plane view of FIG. 12, FIG. 14 is a perspective view of a retention means employed in the second embodiment of the present invention, FIG. 15 is a cross-sectional view of the second embodiment of the present invention, FIG. 16 is a cross-sectional view taken along the line IV—IV of FIG. 15, and FIG. 17a is a cross-sectional view showing the beginning of insertion of the monosheet cassette into the camera.

FIG. 17b is a cross-sectional view showing further insertion of the monosheet cassette into the camera.

FIG. 17c is a cross-sectional view showing removal of the monosheet cassette case from the camera.

Before proceeding with the description, it is to be noted that throughout the attached drawings like numbers refer to like parts. Also, for the purposes of the description, terms such as upper or lower are to be taken as meaning nearer the top or bottom of a normally upright camera, terms such as forwards or rearwards are to be taken as meaning towards or away from the front of a camera, terms such as left or right are to be taken as meaning left or right as seen by a person aiming a camera at an object, and the terms clockwise and anticlockwise are to be taken as meaning as seen by a person looking downwards onto a normally upright camera.

Figure 2:
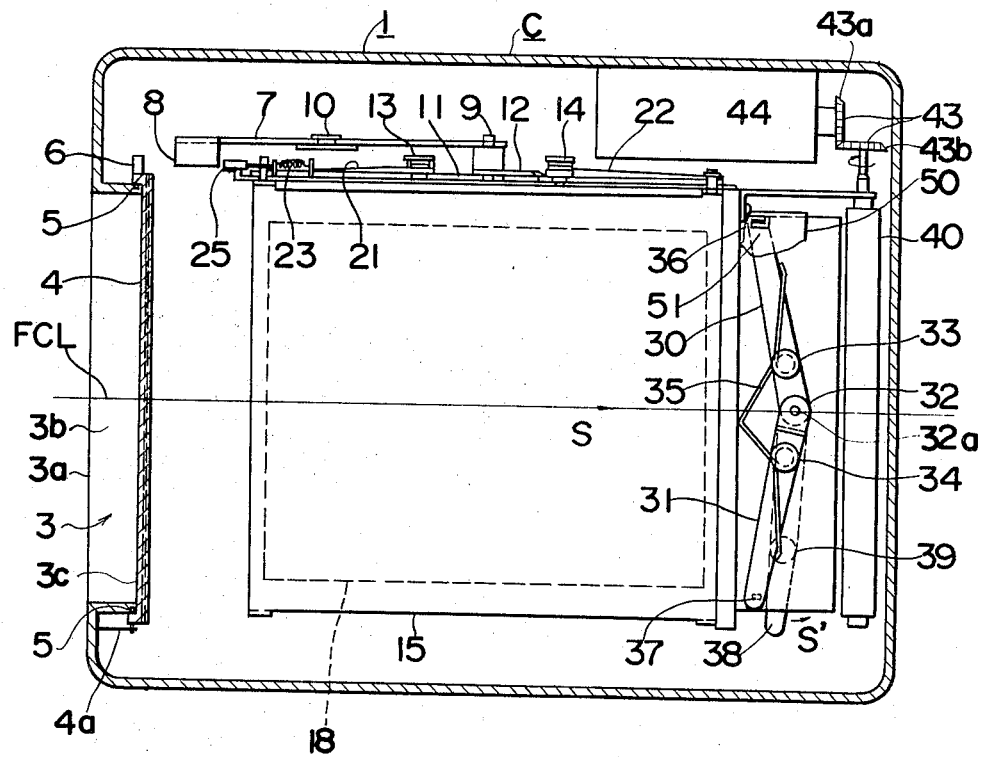
FIG. 2 is a cross-sectional view taken along the line I—I of FIG. 1.

Referring to FIGS. 1, 2, there is shown a body 1 of a camera C, forming a main camera interior 1', and a lens housing portion 1''. A conventional lens 2 is provided in the forward part of the lens housing portion 1''. In a rear portion of the left-hand side of the body 1 there is formed an inset, rectangular entrance 3, through which monosheets 50 protected by a light-proof envelope 102 and contained in a pack 108 (described below) may be inserted into the camera interior 1', the height and width of a pack 108 and of the entrance 3 being approximately equal, whereby a pack 108 may be slidably inserted in the entrance 3 without play. The entrance 3 comprises an open mouth 3a, level with the left-hand side of the body 1, walls 3b, generally at right-angles thereto, and an inner end 3c. The walls 3b possess pile, or fur-like surfaces, to ensure exclusion of light from the camera interior 1' upon insertion of a pack 108. A stop strip 107 is provided at the inner end of the forward side wall 3b. The entrance inner end 3c is normally sealed by a spring-loaded flap door 4, which is larger than the entrance 3 in height and width, whereby light is prevented from entering the camera interior 1'. The flap door 4 pivots about pins 5 provided at the top and bottom rear corners thereof, and is constantly urged by a spring 4a to take up an alignment generally parallel to the left-hand side of the body 1, press against the edge of a groove 3d provided at the entrance inner end 3c, and seal the entrance inner end 3c. Near the top and bottom front corners of the door 4 there are fixedly attached pins 6, which extend vertically upwards or downwards therefrom. When a pack 108 containing a desired number of monosheets in a light-proof envelope 102 is inserted into the camera C, the leading end of the pack 108 contacts and pushes against the flap door 4, and the door 4 is swung clockwise and inwards around the pins 5. When the door 4 is thus swung inwards, the pins 6 extending vertically therefrom contact and push tabs 8, which are fixedly attached to toggle control levers 7, each of which forms part of a toggle assembly.

As described in further detail below, the toggle assemblies control the movement of a pressure plate 15, which lies generally parallel to the back of the camera C, and normally urge the plate 15 forwards by means of springs 21, 22. When the door 4 is opened, the toggle assemblies move the plate 15 rearwards, and the monosheets 50 are slid into the camera interior 1' parallel to the front surface of the plate 15, and moved rightwards until the leading end thereof is stopped by a plate spring 27, the envelope 102 being simultaneously stripped therefrom, as described below. The plate spring 27 is provided in a right-hand, rear portion of the camera interior 1', and lies generally parallel to the side of the camera C. The rear edge of the plate spring 27 is fixedly attached to the camera body 1, and at the front edge thereof there is fixedly attached a triangular detent 27', which has a sloping surface facing rearwards. A similar plate spring 26 lying generally parallel to the side of the camera C is provided in a left-hand, forward portion of the camera interior 1'. The front edge of the plate spring 26 is fixedly attached to the camera body 1, and at the rear edge thereof there is fixedly attached a triangular detent 26', which has a sloping surface facing rearwards.

Upon withdrawal of the pack 108, the monosheets 50 are left in the camera interior 1', and the flap door pins 6 disengage the lever control lever tabs 8, whereupon the toggle assemblies urge the pressure plate 15 forwards. The pressure plate 15 pushes the monosheets 50 forwards, and causes the foremost monosheet 50 to be pressed firmly against the positioning frame 18. The positioning frame 18 is located in the forward part of the camera interior 1', and holds a foremost monosheet 50 in a position P in which the monosheet 50 may be correctly exposed to light reflected from an object to be photographed and passing through the lens 2. When the monosheets 50 are thus moved forwards, the left and right edges thereof ride on the sloping surfaces of the detents 26', 27', respectively, pushing the plate springs 26, 27 slightly outwards, and the monosheets are moved to a location forward of the detents 26', 27', whereupon the plate springs 26, 27 return naturally to their original positions. Since the plate 15 exerts a constant forwards pressure on monosheets 50 in the camera C, when the foremost monosheet 50 has been exposed, and is removed, as described below, the next foremost monosheet 50 is automatically brought into firm contact with the positioning frame 18, in readiness for the next shot. After exposure, processing, and removal of a certain number of monosheets 50 from the camera C, when another set of monosheets 50 in a pack 108 is introduced into the camera C, the door 4 is opened and the plate 15 is moved rearwards, as described above. But any previously inserted monosheets 50 still remaining in the cameral C are prevented from moving rearwards by the detents 26', 27', and the new set of monosheets 50 may therefore be inserted in the space formed between the pressure plate 15 and the previously inserted monosheets 50.

There is a toggle assembly in both the upper and lower rear portions of the camera interior 1'. For simplicity, in the drawings, and in the description below, there is hown, and reference is made to the upper toggle assembly only, it being understood that the lower toggle assembly is shown, therewith.

Figure 3:
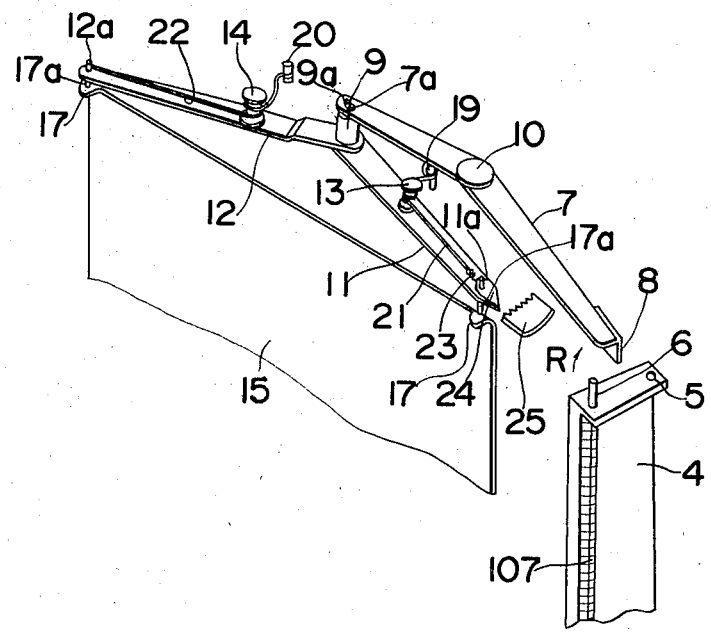
FIG. 3 is a perspective view of a toggle assembly employed in the 1st embodiment of FIG. 1, FIG 4a, is a plane view, on an enlarged scale, of a portion of FIG. 3.

As shown in FIGS. 1, 2, 3, the toggle assembly levers leverrs 7, 11, 12, lying generally parallel to the top of the body 1 and springs 21, 22. The control lever 7 is pivotally mounted on a fixed pin 10 located at a generally central point of the lever 7. Near the inner end 7b of the lever 7, that is, inner with respect to the camera C, there is formed a small elliptical opening 7c. The lever end 7 is slidably and rotatably mounted on the upper end of a pin 9a, which passes through the opening 7a, and which is mounted in a vertical, grooved support shaft 9. The shaft 9 extends and secures between the lever end 7 and the inner ends of the levers 11, 12 by suitable means such as spring washers. The lower end of the pin 9a is rotatably and slidably mounted in elliptical openings formed near the lever inner ends (not shown in Figures). The shaft 9, and hence lever ends 7, 11, 12, lie on the optical axis L of the lens 2. The inner end of the lever 12 is uptured slightly to overlap the inner end of the lever 11. The levers 11, 12 are supported respectively by shafts 13, 14, which are each at an equal distance from the shaft 9 and are rotatably mounted in the camera body 1, thus permitting rotation of the levers 11, 12. Provided in association with the lever 11 there is a wire spring 21. One end of the wire spring 21 is fixedly attached to a pin 19, which is fixedly attached to the camera body 1, and is located to the rear of the lever 11. The spring 21 passes around the support shaft 10 of the lever 11, and the other end thereof is attached to a pin 11a which is fixedly attached to the lever outer end 11. There is similarly provided, in association with the lever 12, a wire spring 22, one end of which is fixedly attached to a pin 20 rearwards of the lever 12, which passes around the support shaft of the lever 12, and the other end of which is attached to a pin 12a at the lever outer end 12. The wire springs 21, 22 act constantly to urge the levers 11, 12 to rotate clockwise and anticlockwise, respectively. That is, both the lever ends 11, 12 are constantly urged as far forwards as possible.

The levers 11, 12 supported the abovementioned pressure plate 15. At each upper corner of the plate 15 there is a tab 17, which is fixedly attached to, or integrally formed with, the plate 15. An upwardly projecting pin 17a is fixedly attached to each tab 17. The upper ends of the pins 17a are rotatably mounted to the lower surface of the outer ends of the levers 11, 12, respectively. The pins 17a may of course, be continuous with the pins 11a, 12a, or the lever 11, pin 11a, and pin 17a and lever 12, pin 12a, and pin 17a be formed as integral units. The plate 15 thus connected to, and supported by the levers 11, 12, and the levers 11, 12 being normally urged forwards by the springs 22, 23, the plate 15, also, is normally urged forwards as far as possible.

Figure 4:
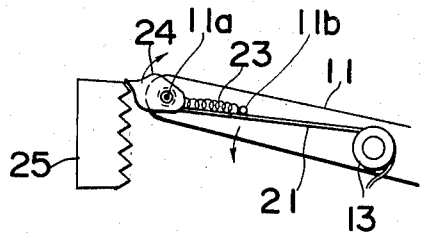
Figure 4:
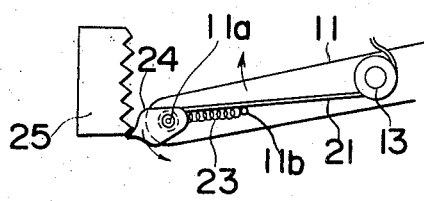

Referring now also to FIG. 4, an ovate pawl 24 is rotatably mounted on a fixed pin 11a near the outer end of the lever 11. Alternatively, the pawl 24 may be rotatably mounted on the abovementioned pin 17a. One end of a compression spring 23 is fixedly attached to the lever 11, at a point 11b thereon further removed than the pin 11a, from the lever outer end. The other end of the spring 23 is fixedly attached to the pawl 24, at a point thereon beyond, that is, outwards of the pin 11a. If the longitudinal axis of the pawl 24 is exactly aligned with that of lever 11, the pin 11a and the points of attachment of the spring 23 to the pawl 24 and to the lever 11 lie in a straight line, and force of the spring 23 exerted on the pawl 24 is directed along the longitudinal axis of the pawl 24 and lever 11. However, this state is evidently one of unstable equilibrium, and the spring 23 normally turns the pawl 24 forwards or rearwards with respect to the lever 11, as described in further detail below. Outwards of the lever end 11, that is, nearer the left-hand side of the camera C, there is provided a fixed rack 25, the teeth of which may be engaged by the pawl 24.

The description will proceed below in reference to the operation of the abovedescribed toggle assembly, and then to the operation and function of the pawl 24 and rack 25. The abovementioned monosheet pack 108 will be described subsequently.

As described above, when a pack 108 containing a desired number of monosheets 50 is inserted into the entrance 3, the flap door 4 is swung anticlockwise, and the pin 6 contacts, and pushes the tab 8 attached to the outer end of the lever 7. The lever outer end 7 is therefore pushed rearwards, the lever 7 pivots on the pin 10, and the lever inner end 7 moves forwards. Forward movement of the lever inner end 7 carries the pin 9a, shaft 9, and lever ends of the levers 11, 12 forwards. The levers 11, 12 are therefore caused to pivot on the pins 13, 14, against the force of the springs 21, 22, and the lever outer ends 11, 12 and the plate 15, attached thereto through the tabs 17 and pins 17a, are carried rearwards, the configuration of the levers 7, 11, 12 and plate 15 being as shown in the chain dot line portions of FIG. 1. Monosheets 50 may now be slid out of the pack 108, and into the camera interior 1', across the front of the plate 15. When the pack 108 is removed, the spring 4a closes the door 4, pressure is removed from the tab 8, and, the springs 21, 22 being unopposed, the lever outer ends 11, 12, and plate 15, are pushed forwards, the levers 7, 11 rotate clockwise, and the lever 12 rotates anticlockwise, the toggle assembly thus returning to approximately the original configuration shown by the solid lines of FIG. 1, and in FIG. 3. The inserted monosheets 50 being interposed between the pressure plate 50 and the abovementioned positioning plate 18, the monosheets 50 also are moved forwards, and the foremost monosheet 50 pressed against the frame 18 in the exposure position P. It is to be noted that when the levers 7, 11, 12 are rotated, the lever inner ends 7, 11, 12 being slidably mounted on the pin 9a, through the openings 7a and the others, the shaft 9 moves forwards or rearwards in a straight line along the optical axis of the lens 2, and the levers 11, 12 may move slightly towards one another, to maintain a constant distance between the lever outer ends 11, 12 supporting the plate 15.

In particular reference now to FIGS. 1, 4, the width of the entrance 3 may be seen to be approximately half the distance from the positioning frame 18 to the rearmost position to which the plate 15 is brought by the toggle assembly upon insertion of a pack 108 into the entrance 3, the width of the entrance 3 being generally equal to the combined thickness of the maximum number of monosheets 50 that may be contained in the camera C at any one time, for example, ten. The rack 25 is located in a forward, left-hand side of the camera interior 1'. The rack 25 has five teeth, the pitch between each tooth corresponding to the thickness of one monosheet 50, the forward to rear length of the rack 25 therefore being equal to the combined thickness of five monosheets. The distance from the front edge of the rack 25 to the positioning frame 18 is also equal to the combined thickness of five monosheets 50. The purpose of the pawl 24 and rack 25 is to prevent further monosheets 50 from being inserted into the camera C when there are more than five unexposed monosheets 50 remaining therewithin. Supposing, first, that there are no monosheets 50 in the camera C, and that a full complement of ten monosheets 50 in a pack 108 is inserted therein. As the outer end of the lever 11 is moved rearwards, the pawl 24 is brought into contact with the front edge of the forward most tooth of the rack 25, is pushed forwards thereby, and rotated clockwise into a forward-pointing position, as shown in FIG. 4 (A). This clockwise rotation of the pawl 24 is aided by the compression spring 23. As the lever outer end 11 continues to move rearwards, the pawl 24 remains in a forward-pointing position, and, since the force of the spring 23 aids the force imparted on the pawl 24 by the rack 25, the pawl 24 may be successively turned a little further clockwise and then turned back slightly anticlockwise, to ride over successive crests, and engage successive teeth of the rack 25.

The pawl 24 still remains in a forward pointing position when the lever outer end 11 has cleared the rear edge of the rack 25, and continues to move rearwards.

When the lever outer end 11 is moved forwards, that is, after loading of ten monosheets 50, and removal of the pack 108, the pawl 24 is brought into contact with the rear edge of the rack 25, and turned anticlockwise, against the force of the spring 23, into a rearward-pointing alignment, as shown in FIG. 4 (B). When one monosheet 50 has been exposed, removed from the position P, the lever outer ends 11, 12 and the plate 15 are moved forward over a distance equal to the thickness of one monosheet 50, to push the next monosheet 50 to the exposure position P, as described above, and the pawl 24 is turned anticlockwise slightly, then clockwise, and engages the rearmost tooth of the rack 25, still remaining in a rearward-pointing alignment.

If, now, it is attempted to introduce more monosheets 50 into the camera C, the alignment of the pawl 24 contact thereof with the forward side of the tooth engaged, and the force of the spring 23 prevent the lever outer end from being moved rearwards, and so the lever 11 may not be rotated anticlockwise, the lever inner ends 11, 12 may not be moved forwards, the lever 7 may not be rotated anticlockwise and the flap door 4 may not be opened. The pawl 24 may, however, be moved forwards, riding over successive nests and engaging successive teeth of the rack 25, and so monosheets 50 may be successively moved forwards, exposed, and removed. Until five monosheets 50 have been exposed and removed, the pawl 24 is engaged with one of the teeth of the rack 25, and no further monosheets 50 may be loaded. but when five monosheets 50 have been exposed and removed, the pawl 24 is brought forwards clear of the front edge of the rack 25. Although the pawl 24 is still inclined rearwards, there is now no obstacle to the front edge thereof, and, if it is wished to insert more monosheets 50, and a pack 108 is inserted in the entrance 3, the toggle assembly may be actuated, the pawl 24 being brought into contact with the front edge of the rack 25 and rotated to a forward-pointing position, as shown in FIG. 4 (A), and the abovedescribed operation is repeated. In other words, if there are more than five monosheets 50 already in the camera C, no more monosheets 50 may be introduced, and if there are five or less monosheets 50 in the camera C, up to five supplementary monosheets 50 may be introduced.

Needless to say, it is not essential that the rack 25 correspond to five monosheets 50, nor that the rack 25 be positioned so that loading of supplementary monosheets 50 is impossible when there are more than five monosheets 50 present in the camera C, but the rack 25 may correspond to any number of monosheets 50 within the loadable range, and the numbers of monosheets 50 present in the camera C for which the rack 25 is set to prevent further loading of supplementary monosheets 50 may vary. In general, it is convenient to set the rack 25 to prevent loading of supplementary monosheets when the number of monosheets in a camera corresponds to the number of shots photographers normally anticipate taking in very rapid succession.

Figure 7:
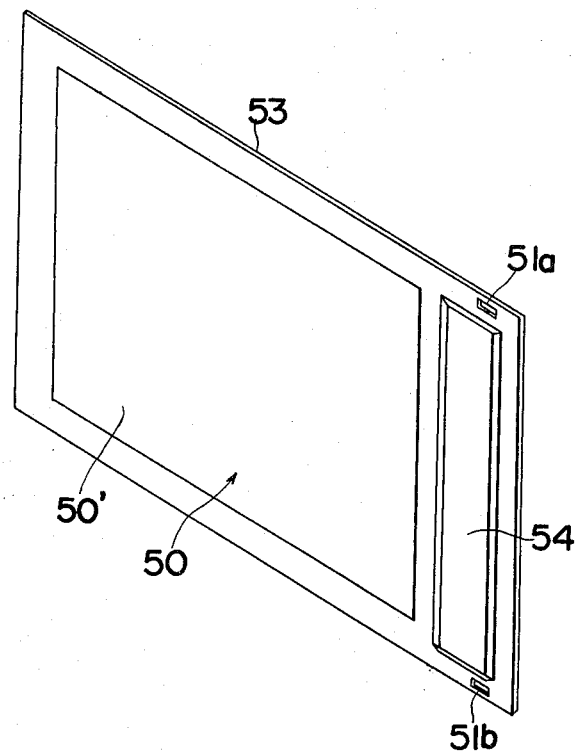
FIG. 7 is a perspective view of a monosheet.

Monosheets 50 employed in this embodiment of the invention are illustrated in FIG. 7, each comprising a conventional negative film and positive film combination 50' held in frame 53. Near the leading edge of the monosheet 50, that is, the edge thereof which first enters and first leaves the camera C, there is provided a sac 54 containing a conventional solution of film processing and developing chemicals. Small holes 51a, 51b are formed in the top and bottom, respectively, of the frame 53, and near the leading edge of the monosheet 50. The holes 51a, 51b are engaged, respectively, by pawls 36, 37 attached to extraction levers 30, 31.

As shown at E of FIG. 1, the extraction levers 30, 31 are provided in a right-hand, forward portion of the camera interior 1', and are slightly forward of the positioning frame 18, that is, forward of a monosheet 50 in the exposure position P. The levers 30, 31 are of equal length, extend upwards and downwards, lie generally parallel to the front and back of the camera C, and the line of action thereof (described in further detail below) is along a plane parallel to the surface of a monosheet 50 in the exposure position P, whereby, after exposure, a monosheet 50 may be withdrawn in a straight line rightwards from the position P to the outside of the camera C.

Figure 5:
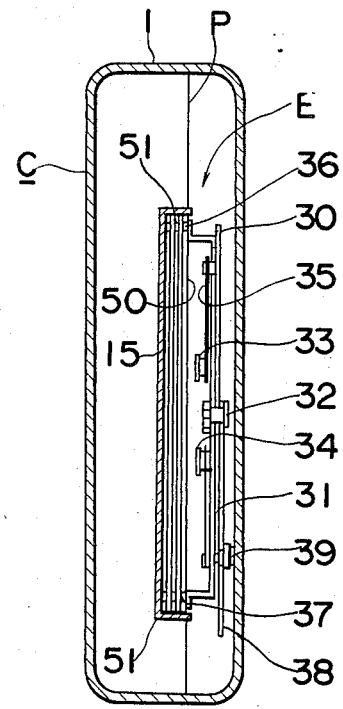
FIG. 5 is a cross-sectional view taken along the line II—II of FIG. 1.

As shown in FIGS. 2, 5, the levers 30, 31 pivot on support pins 33, 34, respectively. The lever inner ends that is, the lower and upper ends, respectively, of the levers 30, 31, which ends are inmost with respect to the camera C, are rotatably mounted on a pin 32a held in a grooved support shaft 32. A wire spring 35 which is fixedly attached to a fixed point, that is to the left of and generally level with the support shaft 32, extends upwards and downwards, passes around the support pins 33, 34, and the spring 35 outer ends contact the right-hand sides of the levers 30, 31, near the outer ends thereof. The wire spring 35 exerts a constant force to urge the levers 30, 31, near the outer ends thereof. The wire spring 35 exerts a constant force to urge the levers 30, 31 into an alignment in which the lever inner ends thereof are inclined rightwards, and the lever outer ends are inclined leftwards, and are adjacent to the right-hand edge of the positioning frame 18. The levers 30, 31 may be moved from this alignment by force exerted by an actuating lever 38.

The actuating lever 38 lies generally parallel to the lever 31, and is mounted on, and pivots about a support pin 39. The inner end of the actuating lever 38 is rotatably mounted on the pin 32a in the shaft 32, and the outer end thereof is connected through a suitable linkage means to a shutter release mechanism (not shown in FIGS.).

When the camera shutter is released, and returns to its normal position, that is, immediately after exposure of a foremost monosheet 50, the linkage means causes the actuating lever outer end to move rightwards, thus causing the lever 38 to pivot about the support pin 39, and the inner end thereof to move to the left. Since the actuating lever inner end 38 is mounted on the pin 32a, the pin 32a and extraction lever inner ends 30, 31 are simultaneously moved leftwards, the levers 30, 31 being caused to pivot on the pins 33, 34, against the force of the wire spring 35, and the lever outer ends 30, 31 moving rightwards. When the camera shutter has returned to its non-operative position the actuating lever 38 is disengaged, and, the force of the spring 35 how being unopposed, the levers 30, 31 are rotated back to their original alignment.

The abovementioned pawls 36, 37 are integrally formed with the levers 30, 31, respectively, and extend rearwards from the outer ends thereof. Each pawl 36, 37 has a straight right-hand edge, which is generally parallel to the side of the camera C, and a sloping left-hand edge. When a monosheet 50 is at the exposure position P, the pawls 36, 37 fit into the upper and lower engagement holes 51a, 51b, respectively, of the frame 53 of the monosheet 50. When, after exposure of the monosheet 50, the camera shutter is returned to its normal, non-operative position, the levers 30, 31 are rotated and the lever outer ends are moved rightwards, the straight edges of the pawls 36, 37 press against the right-hand ends of the monosheet engagement holes 51a, 51b, and draw the monosheet 50 rightwards. The monosheet 50 is drawn rightwards in this manner until the leading edge thereof contacts, and is engaged by rolls 40, 41, as described below. At this point, the actuating lever 38 having been disengaged, the extraction levers 30, 31 return to their original alignment, as described above, and the lever outer ends 30, 31 travel leftwards back to their original positions. At the same time, the monosheet 50 continues to be drawn rightwards, by the action of the rolls 40, 41. When the lever outer ends 30, 31 travel leftwards, the left-hand sloping surfaces of the pawls 36, 37 permit the pawls 36, 37 to slide out of the monosheet engagement holes 51a, 51b ride on the upper and lower portions of the frame 53, and then slide into the engagement holes 51a, 51b of the next monosheet 50, which, meantime, has been pushed forward by the pressure plate 15 into the exposure position P. When this next monosheet 50 is exposed, the abovedescribed operation is repeated, and so also for succeeding monosheets 50.

Figure 6:
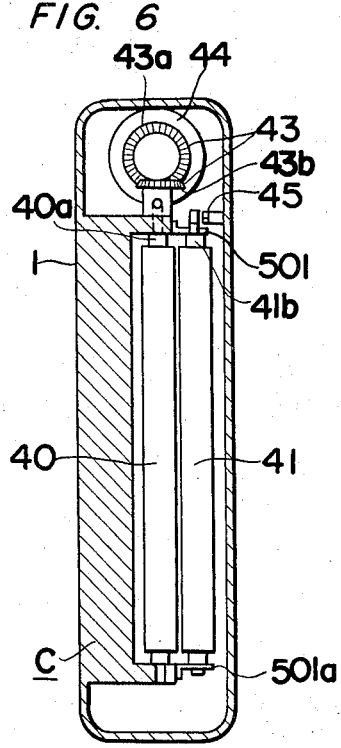
FIG. 6 is a cross-sectional view taken along the line III—III of FIG. 1.

As shown in the section II—II of FIG. 1, and FIGS. 2, 6, the abovementioned rolls 40, 41 are a pair of parallel, vertically aligned rolls, provided in the front, right-hand corner of the camera interior 1', the roll 40 being to the rear of the roll 41. The line between the rollers 40, 41 is aligned with the line of advance of monosheet 50 drawn rightwards by the levers 30, 31, and is also aligned with a longitudinal, slit-like outlet 42, which is formed in the right-hand side of the camera body 1, and has dimensions permitting the passage of one monosheet 50 at a time, from the interior 1' of the camera C to the exterior thereof. The rolls 40, 41 are mounted on shafts 40a, 41a, that are rotatably mounted in the body 1. The roll 40 acts as a drive roll, and is itself driven through a bevel gear train 43 by a motor 44, which is situated in the upper, right-hand portion of the camera interior 1'. The bevel gear train 43 comprises a vertically aligned bevel gear 43a, which is driven directly by the motor 44, and a horizontally aligned bevel gear, which is fixedly mounted on the upper end of the roll shaft 40a, is engaged and driven clockwise by the gear 43a, and therefore causes the shaft 40a and roll 40 to rotate clockwise. The motor 44 is actuated, and the roll 40 driven, upon closure of either of two parallel-connected, normally open contacts 45. The contact 45 is closed, through a suitable linkage mechanism, upon actuation of the camera shutter. The contact 45 is closed by a plate spring 501 in a manner described below.

The plate spring 501 is aligned generally parallel to the front and rear of the camera C, the left-hand side thereof is fixedly attached to the right-hand side of the positioning frame 18, and the right side thereof contacts, the upper end of the roll 40, but does not impede the rotation of the roll 40. A similar spring 501a is similarly provided at the lower end of the right-hand side of the frame 18 and contacts the lower end of the roll 40. The plate springs 501, 501a exert a constant pressure urging the roll 41 towards the roll 40. When a monosheet 50 is drawn rightwards by the extraction levers 30, 31, the roll 40 is already rotating, since the motor 44 has been actuated, due to closure of the contact 45, upon actuation of the camera shutter. The leading edge of the monosheet 50 is therefore engaged by the rolls 40, 41 and drawn therebetween. The presence of the monosheet 50 between the rolls 40, 41 causes the roll 41 to be pushed slightly away from the roll 40, and the plate springs 501, 501a to be bent slightly forwards. When the upper plate spring 501 is thus bent forward, it closes the contact 45. Therefore, even after the camera shutter returns to its normal position, and the contact 45 re-opens, the motor 44 continues to be actuated, and continues to drive the roll 40, whereby the monosheet 50 continues to be drawn rightwards through the rolls 40, 41, and is passed through the outlet 42 to the exterior of the camera C. When, the monosheet 50 has passed completely through the rolls 40, 41, the force of the springs 501, 501a is no longer opposed, the springs 501, 501a and roll 41 move slightly rearwards, back to their original positions, the spring 501 releases the contact 45, which thereupon opens, and the motor 44 remains unactuated until the next shutter operation to expose the next monosheet 50 at position P.

While monosheets 50 are being drawn through the rolls 40, 41, and before passing out of the outlet 42, the monosheets 50 are processed in a conventionally known manner. That is, the rolls 40, 41 apply pressure on a monosheet 50 drawn therethrough, the processing solution in the sac 54 is squeezed out on the surface of the monosheet 50, whereby a positive image of an external object is transferred and developed thereon.

Referring now to FIGS. 8, 9, the abovementioned pack 108, containing monosheets 50, may be seen to comprise the abovementioned envelope 102, a protection sleeve 101, a push strip 103, and a holding member 106. The pack 108 contains a required number of monosheets 50 (five shown in FIGS. 8, 9, the monosheets 50 being stacked flat against one another. The monosheets 50 in the pack 108 are completely covered and protected by the envelope 102, which is pliable, and light-proof, and is made of film-like plastic, or any other suitable material. At the leading edges of the monosheets 50, that is, the right-hand edges thereof, when the monosheets 50 are inserted into, and transferred through the camera C, the envelope 102 forms loose ends 104, which are folded over, and glued, or similarly attached, to one another. The bond between the envelope ends 104 is sufficient to hold monosheets 50 in the pack 108, and ensure exclusion of light therefrom prior to use thereof, but may be broken upon insertion of monosheets 50 into the camera C.

The protection sleeve 101 is generally in the form of an open-ended box, is made of a stiff material and is provided over the right-hand portions of the monosheets 50, where it protects the sacs 54. The sleeve 101 has a height and width such that the sleeve 101 may fit slidably, but exactly into the entrance 3. The sleeve 101 is made longer than the distance from the entrance mouth 3a to the abovementioned stopper strip 107, to permit easy insertion of the monosheets 50 therethrough and easy retraction thereof, after insertion of the monosheets 50 into the camera C. The envelope 102 is fixedly bonded to the inside of the sleeve 101.

The holding member 106 is made of a stiff material, fits around the left-hand ends of the monosheets 50, and has dimensions permitting it to pass into the sleeve 101. The push strip 103 is fixedly attached to, and extends at right-angles from, the base of the holding member 106. The purpose of the push strip 103 is to facilitate manual insertion of the monosheets 50 held in the pack 108 into the camera interior 1', and the length thereof is sufficient to permit the monosheets 50 to be advanced as far as the abovementioned stop plate 27.

Referring now to FIGS. 8, 10, in order to introduce the monosheets 50 into the camera C, the protective sleeve 101 is inserted into the entrance 3. Thus inserting the sleeve 101 brings the leading (right-hand) side against the flap door 4, which is therefore swung open, and actuates the toggle assemblies to draw the pressure plate 15 rearwards, as described above. When the door 4 is open, light remains excluded from the camera interior 1', since the outside of the sleeve 101 is in close contact with the pile surface of the entrance walls 3b, and the light-proof envelope 102 is fixedly bonded to the inside of the sleeve 101. Next, the push-strip 103 is gripped and pushed rightwards. Pressure from the push strip 103 is transferred evenly to the monosheets 50 by the holding member 106, the monosheets 50 are moved rightwards, and the leading edges thereof press against and break apart the bonded loose ends 104 of the envelope 102. Continued rightwards pressure on the push-strip 103 pushes the monosheets into the camera interior 1', while at the same time, the envelope 2, being fixedly bonded to the inside of the sleeve 101, is stripped from the monosheets 50, and folds up inside the sleeve 101, as shown in FIG. 10. When the monosheets 50 have been moved rightwards as far as the stop plate 27, the push strip 103 is moved leftwards, and the holding member 106, envelope 102, and sleeve 101 are retracted, leaving the monosheets 50 in the camera interior 1'. When the sleeve 101 is retracted, the door spring 4a is unopposed, the door 4 is swung back to seal the entrance 3, and the toggle assemblies being disengaged, the pressure plate 15 moves the monosheets 50 forwards, as described above.

Although all packs 108 have the same construction, different packs 108 may contain different numbers of monosheets 50, from one up to the maximum number insertable in the camera C, whereby a varying number of supplementary monosheets 50 may be inserted into the camera C on different occasions. In actual practice, for a camera with a capacity of ten monosheets 50, it would be convenient, for example, to provide packs 108 containing five monosheets 50 and ten monosheets 50, and to set the abovementioned rack 25 to prevent loading of supplementary monosheets 50 when there are more than five monosheets 50 available in the camera C. In this case, it would be always possible to rapidly insert supplementary monosheets 50, to have a minimum of six monosheets 50 available for taking shots in rapid succession. Needless to say, these numbers of monosheets 50, or this setting of the rack 25 are cited merely by way of example, and the numbers or setting may be varied as required.

As described above, monosheets 50 are easily and rapidly inserted into a camera, successive monosheets 50 are automatically moved forwards to an exposure position P, and automatically processed and removed from the camera C after exposure, and a photographer is always able to ensure supply of a required number of immediately available monosheets, without any wastage.

In a 2nd embodiment of the invention, there is employed a cassette 212 in place of a pack 108. As shown in FIGS. 11, 12, 13, the cassette 212 comprises a flat case 201, which is made of hard plastic, cardboard, or any other material having suitable stiffness. The case 201 has a generally rectangular box-like structure, and is open at one end, which is the end thereof first inserted into the camera C, that is, the right-hand end in the drawings. The inside of the case 201 is divided into two compartments 201a, 201b by an inwardly projecting stop ridge 207, the compartment 201a being the right-hand, or leading portion of the case 201. A required number of monosheets 50 are contained in the compartment 201a. The monosheets 50 in the compartment 201a are held in a pliable, ribbon-like band 202. In a generallly central portion the band 202 is fixedly bonded to the inside of the base of a holding member 203, in which the left-hand ends of the monosheets 50 are held. The two halves of the band 202 extend forwards, around the monosheets 50, and are lightly bonded together, whereby the monosheets 50 are held in the band 202. The outer, that is, right-hand, end of that half of the band 202 lying at the rear of the monosheets 50 forms a flexural extension 204, which extends beyond the leading edge of the monosheets 50. The extension 204 has a spring force which urges the extension 204 to extend rightwards, and to be aligned parallel to the longitudinal axis of the cassette 212, that is, parallel to the line of insertion of monosheets 50 into the camera C. In the extension 204 there is formed a small engagement hole 205. At the right-hand end of the compartment 201a there is provided a plate spring 208. One end of the plate spring 208 is fixedly attached to the front wall of the case 201, and the other, free end thereof lightly presses the right-hand portion of the frame 53 of the foremost monosheet 50 in the case 201. The spring 208 exerts a constant pressure towards the rear wall of the case 201, whereby the monosheets 50 are held lightly in place.

One end of an cord-like elastic retraction element 206, is fixedly attached to the outside of the base of the abovementioned holding member 203. The other end of the retraction element 206 is fixedly attached to the left-hand end wall of the case 201. The retraction element 206 exerts a constant pressure pulling the holding member 203 up against the ridge 207, whereby the monosheets 50 also are moved to a correct position in the compartment 201, prior to insertion in the camera C. The retraction element 206 is, however, extendible, and the holding member 203 and ridge 207 may be separated, as described below.

Near the right-hand end of the cartridge 212, there is provided a sleeve 210, which, similarly to the sleeve 107 of the case 108 in the 1st embodiment, fits exactly into the camera entrance 3, and serves to protect the sacs 54 of the monosheets 50. The case 201 fits exactly into the sleeve 210, and may slide therethrough without play. The sleeve is firmly, but not fixedly, bonded to the leading end of the case 201 to prevent the case 201 being slid out of the sleeve 210.

Light-proof covers 209 are fixedly attached the sleeve 210. The light-proof covers 209 are folded over the open end of the case 201, and over one another, and are firmly, but not fixedly, bonded to one another, whereby the case open end is sealed, and the monosheets 50 in the cartridge 212 are completely protected from exposure to light during non-use. When the open end of the case 201 is thus sealed by the covers 209, the band extension 204 is bent towards the leading edges of the monosheets 50, as shown by the dotted line 205' in FIG. 11. The left end of the cartridge 212 is covered by a hod 211, which is made of a suitable stiff material, and permits easy manipulation of the cartridge 212.

In addition to the abovedescribed cartridge 212, and to the camera elements described in reference to the 1st embodiment of the invnention, there is also provided, in association with the 2nd embodiment, a band 202 temporary retention means.

The structure of the band retention means is shown in FIG. 14, and the location thereof in the camera C' is shown in FIGS. 15, 16.

Referring therefore to FIGS. 14, 15, 16, the band retention means may be seen to comprise a long lever 60 which is located in a lower portion of the camera interior 1', extends from the vicinity of the stop plate 27 to the vicinity of the entrance 3, and is pivotally mounted at a generally central point on a fixed shaft 61. The left-hand end of the lever 60, that is, the end thereof in the vicinity of the entrance 3, is upturned, and the tip end 63 thereof has a leftwardly sloping surface, and lies slightly above the level of the base of the entrance 3. A rearwardly extending slider 64 is fixedly attached to the other, right-hand end of the lever 60. A wire-form spring 62 is wound around the lever pivot shaft 61. One end of the wire-form spring 62 is attached to a fixed pin 62', and the other end thereof is attached to the lever 60, at a point thereon left of the shaft 61. The spring 61 exerts a constant force urging the lever 60 to rotate into a normal alignment in which the sloping tip end 63 is maintained above the level of the base of the entance 3.

The slider 64 contacts and presses against the lower part of a rearwardly sloping slide block 65. A vertical shaft 66 is fixedly mounted in the slide block 65. A wire spring 67 is wound around the vertical shaft 66. One end of the wire spring 67 is fixedly attached to a fixed pin 68, and the other end thereof contacts, and presses against the rear of the slide block 65. The spring 67 exerts a constant force tending to turn the block 65 and shaft 66 anticlockwise. This force is normally opposed by the slider 64 contacting the lower, thicker part of the slide block 65. When, however, the lever 60 right-hand end and slider 64 are raised, as described below, the slider 64 moves to the upper, thinner part of the slide block 65, and the slide block 65 and shaft 66 are rotated a proportional amount anticlockwise. When the slider 64 is again lowered to the thicker portion of the block 65, the block 65 and shaft 66 are, of course, rotated clockwise, back to their original alignment. A pennant-like plate 69 is fixedly mounted on the shaft 66, at the upper end thereof. Being fixedly mounted on the shaft 66, the plate 69 is rotated anticlockwise or clockwise together with the block 65 and shaft 66. At the outer end of the plate 69, and on the front surface thereof, there is fixedly attached a small, forwardly projecting stud 70, which is for engagement of the abovementioned hole 205 in the extension 204 of the monosheet holding band 202.

Figure 17:
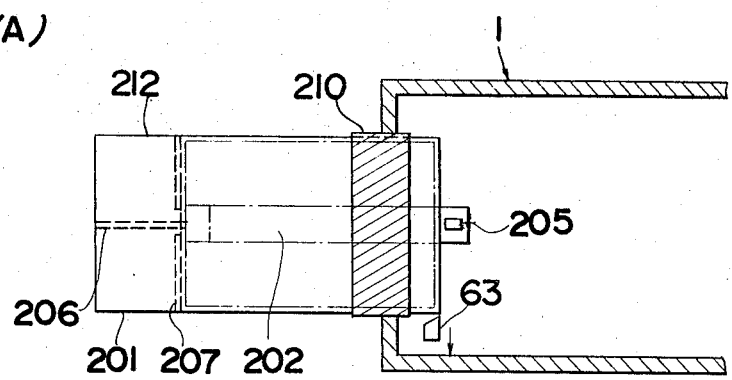
Figure 17:
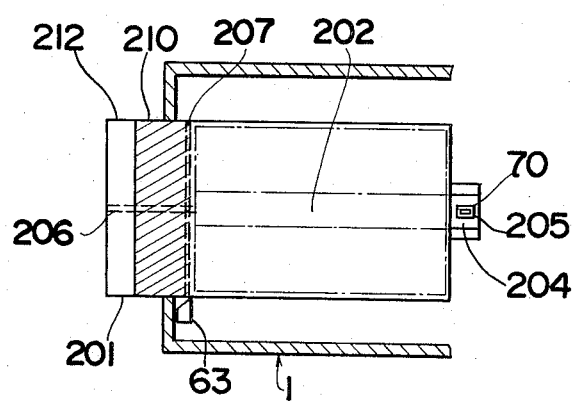
Figure 17:
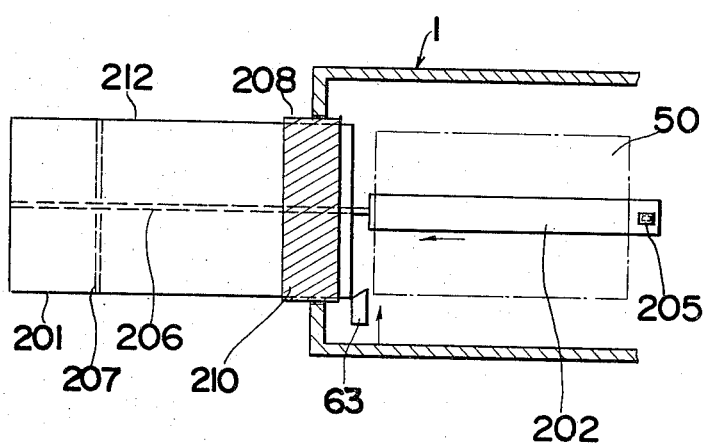

Referring now to FIGS. 15, 16, 17, to insert monosheets 50 held in the cassette 212 into the camera C', the leading end of the cassette 212 is inserted into the entrance 3, and the leading edge of the sleeve 210 brought into contact with the stop strip 107. This causes the door 4 to swing inwards, the upper and lower toggle assemblies to be actuated, and the plate 15 to be drawn rearwards, in the same manner as described in reference to the 1st embodiment. The sleeve 210 fitting exactly into the entrance 3, and the case 201 fitting exactly into the sleeve 210, no light enters the camera C', even though the door 4 is opened. The holding member 211 is pushed rightwards. The sleeve 210 may not move beyond the entrance 3, and so the case 201 slides through the sleeve 210 into the camera interior 1'. The leading edges of the monosheets 50 push against, and break open the covers 209, which are fixedly attached to the sleeve 210, whereupon the holder band extension 204 straightens out, to extend rightwards as shown in FIG. 17 (A). The configuration within the case 201 remains otherwise unchanged. As the case 201 enters the camera interior 1', the bottom of the case 201 contacts, and rides on the sloping top end 63 of the lever 60, thus depressing the left-hand end of the lever 60, and at the same time being partially supported and guided thereby. The left-hand end of the lever 60 being depressed, the right-hand end thereof is raised, the slider 64 rides up to a thinner portion of the sliding block 65, and the block 65, shaft 66, and plate 69 are rotated anticlockwise and forwards, to the position indicated by chain-dot line portions of FIGS. 15, 16. When the leading end of the case 201 approaches the stop plate 27 in the right-hand portion of the camera interior 1', the holder band extension 204 contacts and pushes slightly against the plate 69 and stud 70. When leading end of the case 201 and leading edges of the monosheets 50 come up against the stop plate 27, the stud 70 clicks into, and engages the hole 205 in the extension 204, as shown 211 is in FIG. 17 (B). When now the holding member is pulled leftwards a certain amount, the case 201 starts being pulled out through the sleeve 210, but the band 202, and monosheets 50 held therein, are retained within the camera interior 1', due to the engagement of the stud 70 and hole 205. As the case 201 continues to be moved leftwards out through the sleeve 210, the retraction element 206 is gradually extended, and the ridge 207 and left-hand end of the case 201 are gradually moved away from the holding member 203, which is fixedly attached to the band 202, thus gradually increasing tension imparted to the retraction element 206. At the same time as the right-hand end of the case 201 approaches the sleeve 210, and clears the left-hand edges of the monosheets 50, the bottom of the case 201 is moved out of contact with the tip end 63 of the lever 60. The force of the spring 62 is therefore no longer opposed, the lever 60 is turned about the pin 61, the right-hand end of the lever 60 is lowered, the slider 64 is moved to the thicker part of the block 65, the block 65, lever 66 and plate 69 are rotated clockwise, and the stud 70 disengages the hole 205, as shown schematically in FIG. 17 (C). The force of the retraction element 206 pulling on the holding member 203 breaks the bond between the forward portions of the band 202, and the hod 203 and band 202 are rapidly retracted back to the ridge 207. When, after this, the case 201 and sleeve 210 and completely removed from the entrance 3, the door 4 is closed by the spring 4a. Thereafter operation is as described in reference to the 1st embodiment of the invention.

Needless to say in both the abovedescribed embodiments of the invention, various mechanically actuated elements may be easily replaced by electromagnet elements, or otherwise modified, without in any way departing from the spirit and principles of the invention.

As is clear from the above description, the present invention provides an auto-process camera in which monosheets are easily and rapidly inserted, successive monosheets are automatically brought to an exposure position, and automatically processed and withdrawn from the camera after exposure. The camera of the invention is light and compact, thus rendering manipulation thereof easy. The camera of the invention also offers the particular advantage that varying numbers of monosheets may be inserted into the camera according to the requirements of different situations, thus making for economic use of monosheets, and permitting rapid and flexible exercise of photographic techniques.

What is claimed is:

1. An auto-process camera comprising
   a body forming a main camera interior and a lens housing portion,
   a rectangular entrance provided in the side of the body through which at least one sheet of film protected by a light-proof envelope is slidably inserted into the camera interior as far as a set position in light-proof condition, the envelope being automatically broken off upon insertion of film into the camera interior,
   a means for sealing the entrance of the body to prevent light from entering into the camera interior in normal condition, and permitting insertion of film into the camera interior,
   a means for holding and automatically advancing sheets of film in succession from the set position to a foremost position for exposure thereof through the lens,
   a means operating cooperatively with said holding and advancing means to permit introduction of film from the entrance of the body to the set position, and
   a means for automoatically removing successively exposed sheets of film from the camera.

2. An auto-process camera as defined in claim 1, wherein further comprises a means for preventing sheets of film from entering into the camera interior when there are more than certain sheets of unexposed film remaining therewithin.

3. An auto-process camera as defined in claim 1, wherein further comprises a means for facilitating separation of the envelope from sheets of film entering into the camera interior.

4. An auto-process camera as defined in claim 1, wherein further comprises a means for automatically processing successively exposed sheets of film when removing by the removing means.

5. An auto-process camera as defined in claim 1, wherein said sealing means comprises a flap door pivotally provided and constantly urged by a spring to close the entrance of the body at the inner side of the entrance.

6. An auto-process camera as defined in claim 1, wherein said holding and advancing means comprises a pressure plate normally urged by a spring to press sheets of film from the set position to the foremost position.

7. An auto-process camera comprising
   a body forming a main camera interior and a lens housing portion,
   a rectangular entrance provided in the side of the body, through which at least one sheet of monosheet, which is a composite assembly of a photosensitive sheet, a positive film and a solution of processing and developing chemicals, protected by a light-proof envelope is slidably inserted into the camera interior as far as a set position in light-proof condition, the envelope being automatically broken off upon insertion of film into the camera interior,
   a means for sealing the entrance of the body to prevent light from entering into the camera interior in normal condition, and permitting insertion of monosheets into the camera interior,
   a means for preventing the envelope contained monosheets therein from entering into the entrance of the body when there are more than certain sheets of unexposed monosheets remaining within the camera interior,
   a means for holding and automatically advancing monosheets in succession from the set position to a foremost position for exposure thereof through the lens,
   a means operating cooperatively with said holding and advancing means to permit introduction of monosheets from the entrance of the body to the set position,
   a means for automatically removing successively exposed monosheets from the camera, and
   a means for automatically processing successively exposed monosheets when removing by said removing means.

* * * * *